Aug. 8, 1933.   E. G. STAUDE   1,921,590
FLUID POWER CONTROLLING MECHANISM
Filed July 3, 1929    13 Sheets-Sheet 1

INVENTOR
EDWIN G. STAUDE
BY
ATTORNEYS

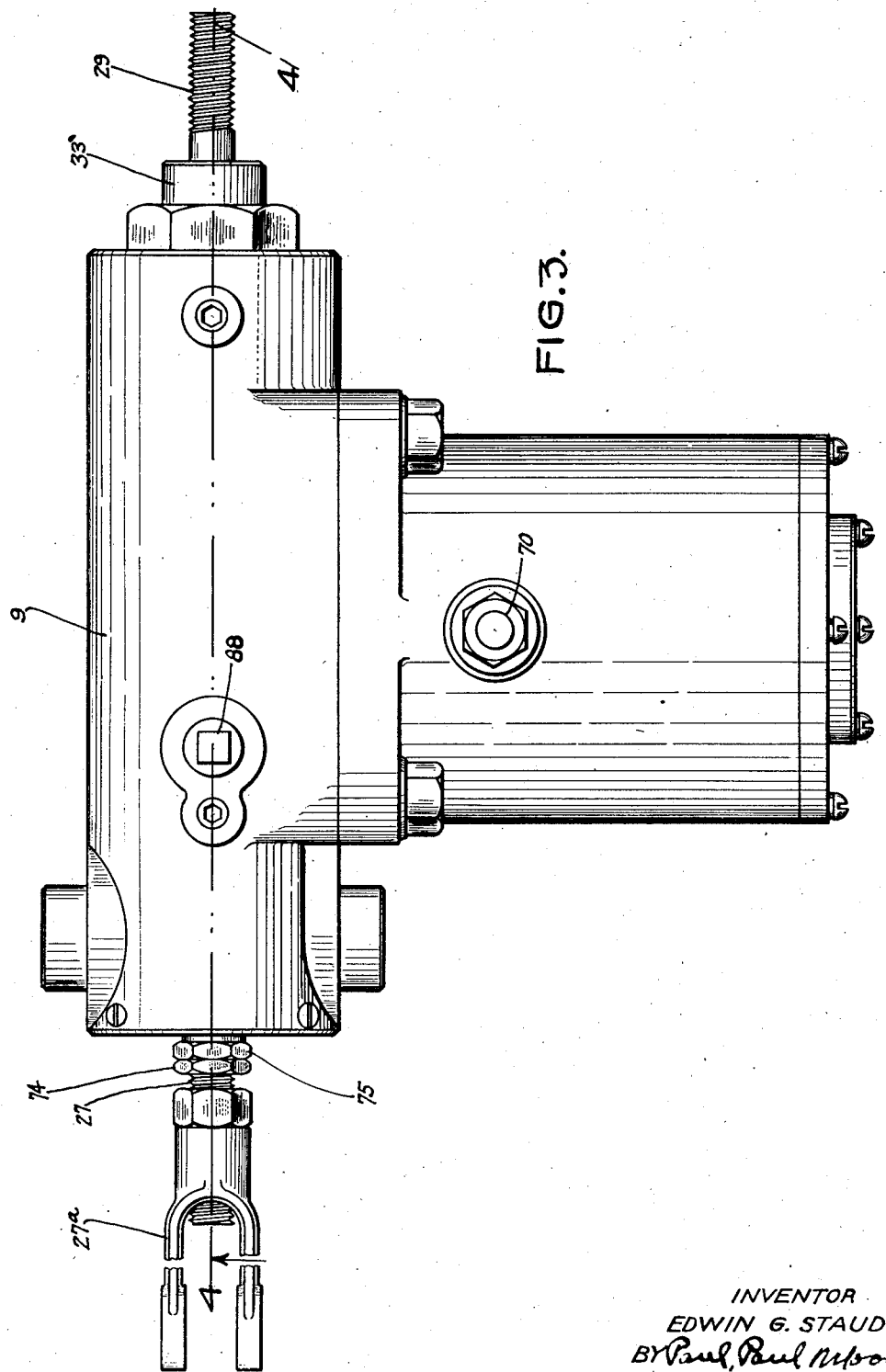

Aug. 8, 1933.  E. G. STAUDE  1,921,590
FLUID POWER CONTROLLING MECHANISM
Filed July 3, 1929   13 Sheets-Sheet 3
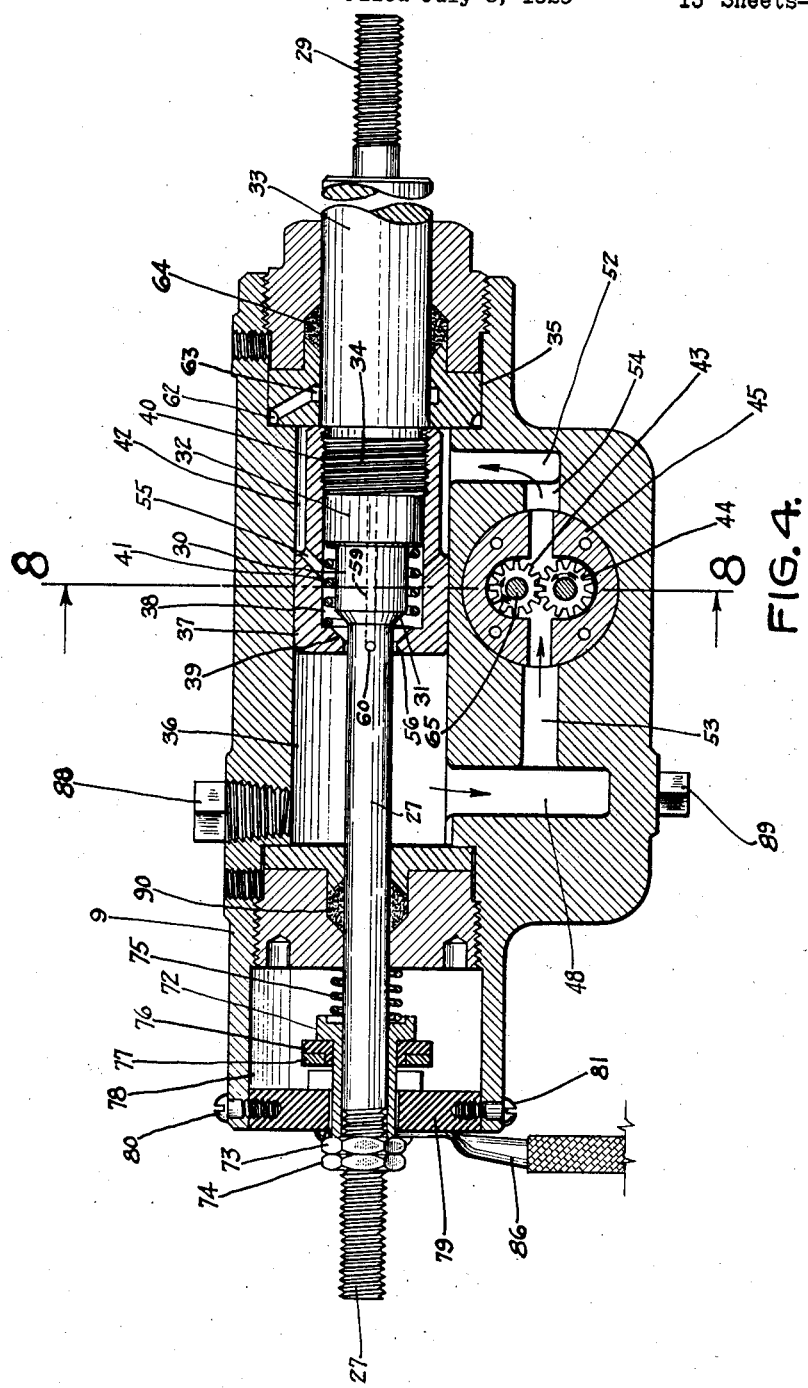
INVENTOR
EDWIN G. STAUDE
BY
ATTORNEYS

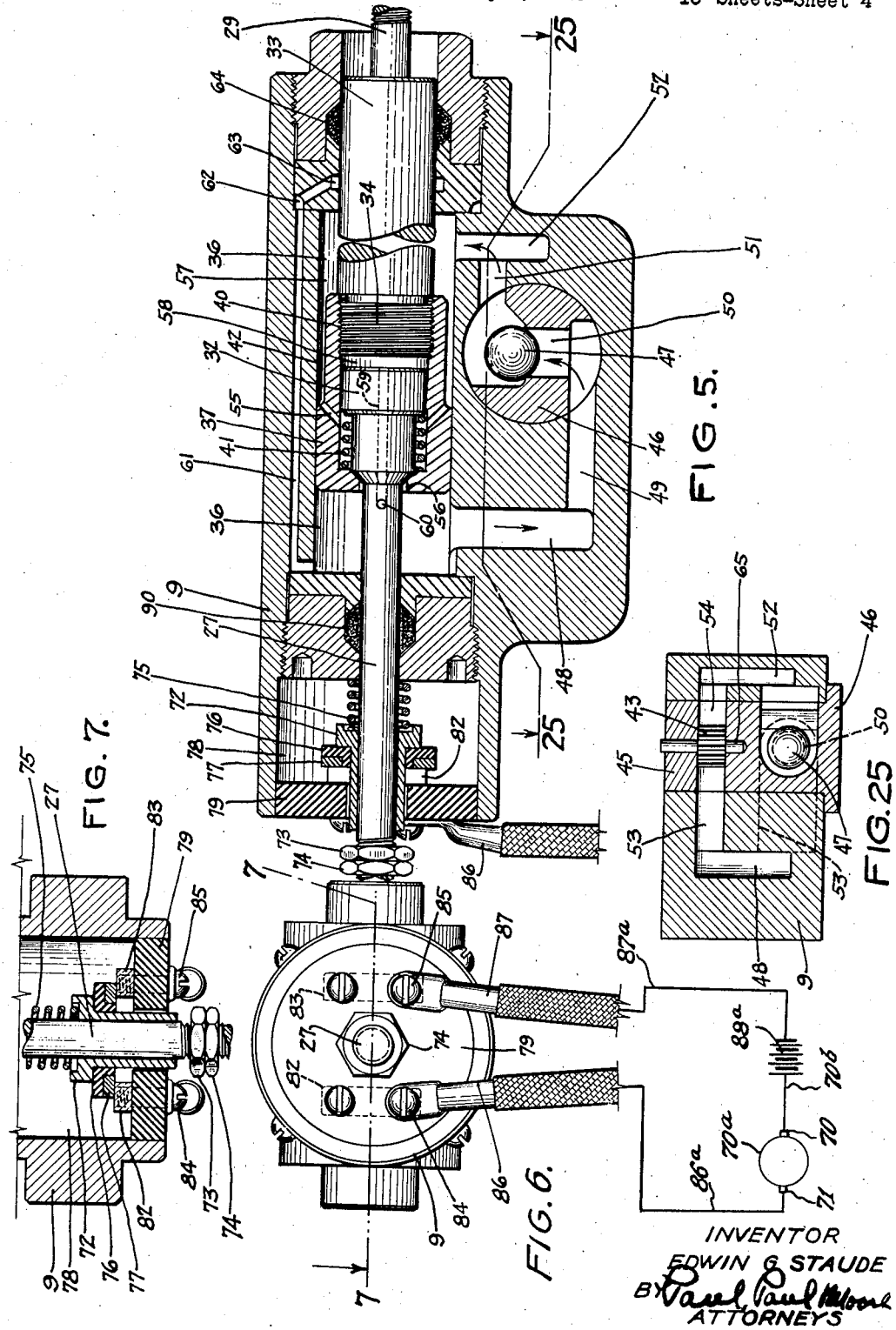

Aug. 8, 1933.  E. G. STAUDE  1,921,590
FLUID POWER CONTROLLING MECHANISM
Filed July 3, 1929   13 Sheets-Sheet 5

INVENTOR
EDWIN G. STAUDE
BY
ATTORNEYS

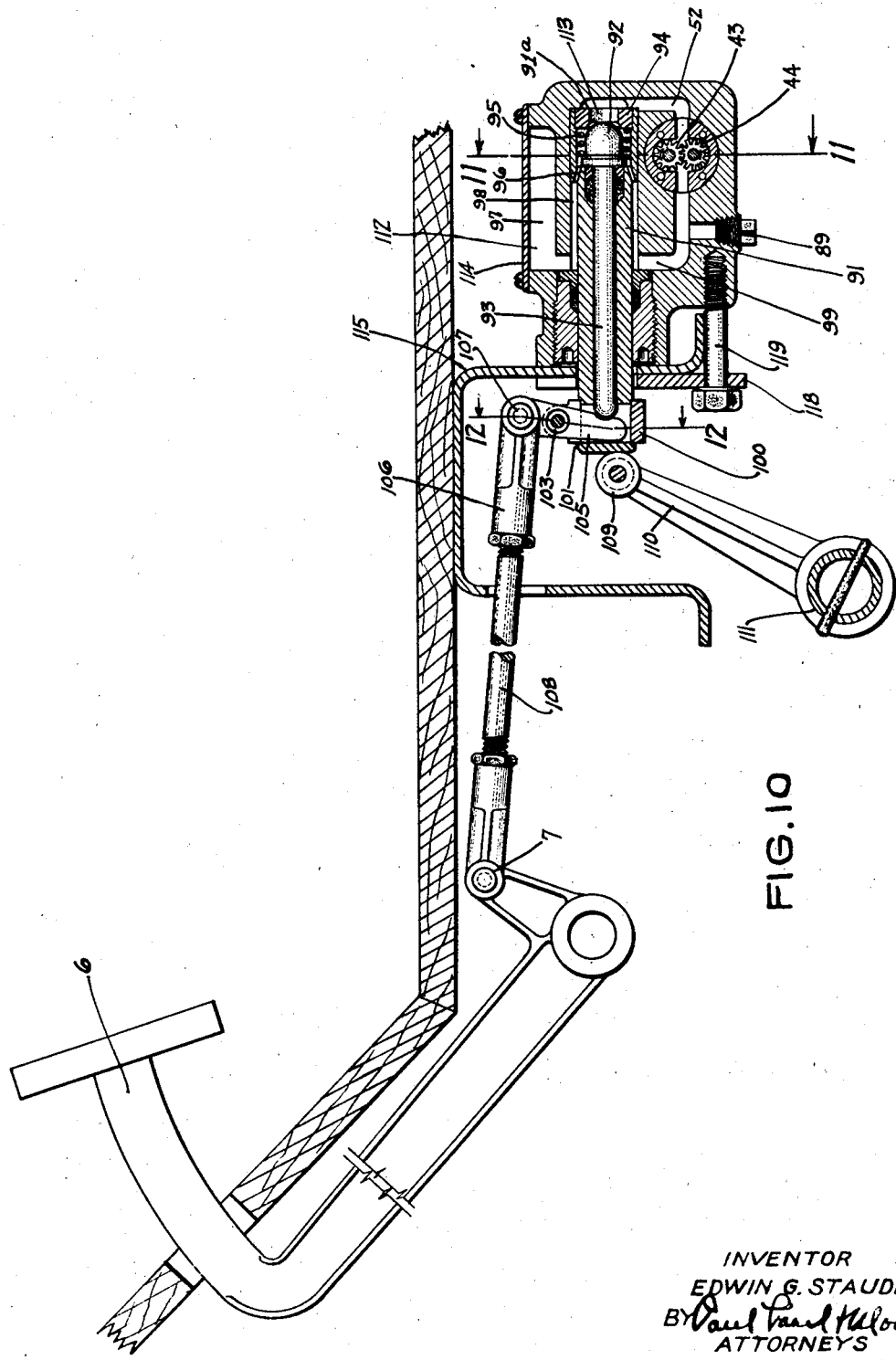

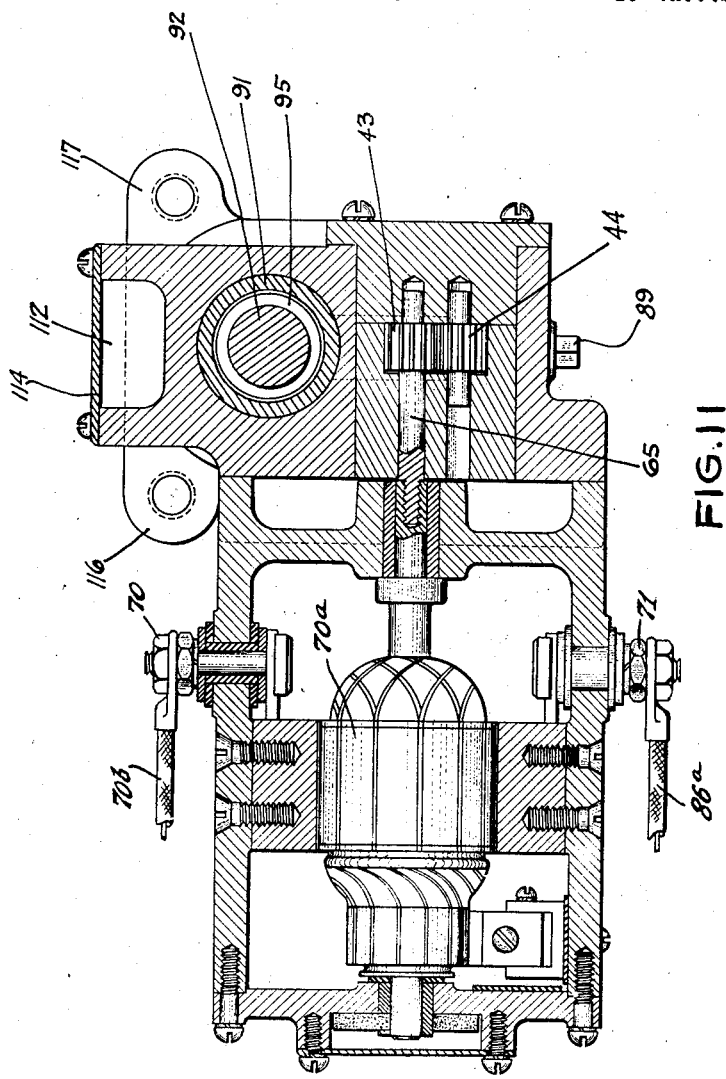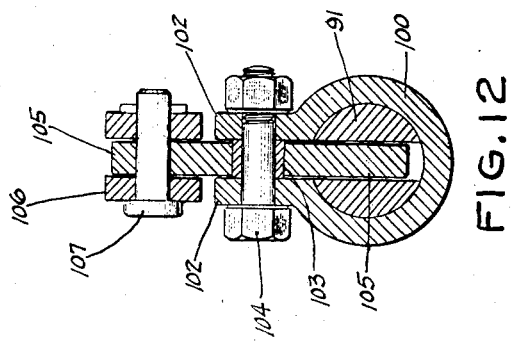

Aug. 8, 1933.  E. G. STAUDE  1,921,590
FLUID POWER CONTROLLING MECHANISM
Filed July 3, 1929  13 Sheets-Sheet 8

INVENTOR
EDWIN G. STAUDE
BY
ATTORNEYS

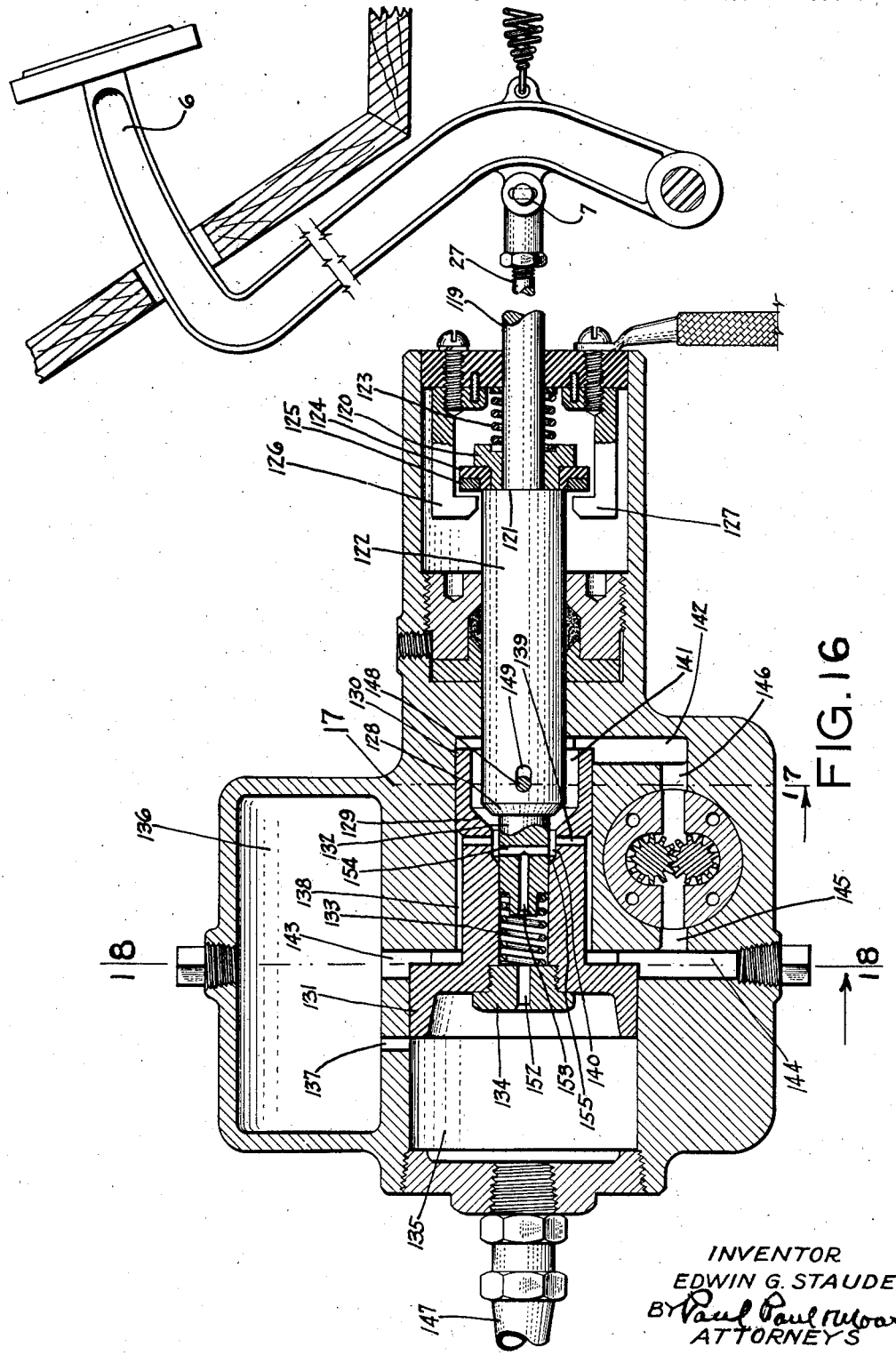

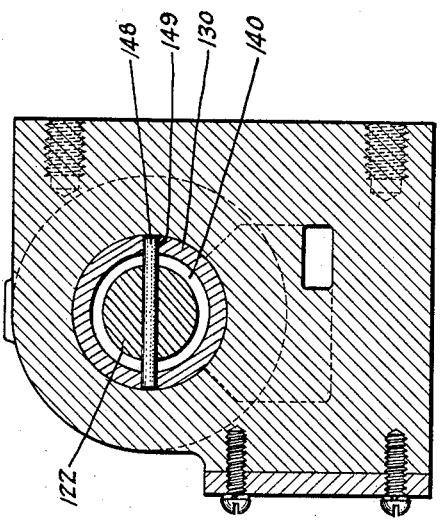
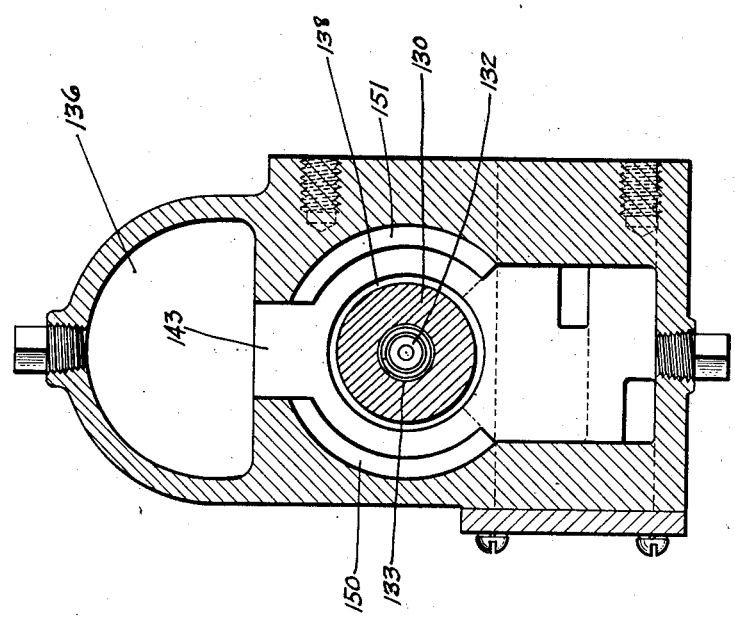

Aug. 8, 1933.          E. G. STAUDE          1,921,590
                FLUID POWER CONTROLLING MECHANISM
                    Filed July 3, 1929       13 Sheets-Sheet 11
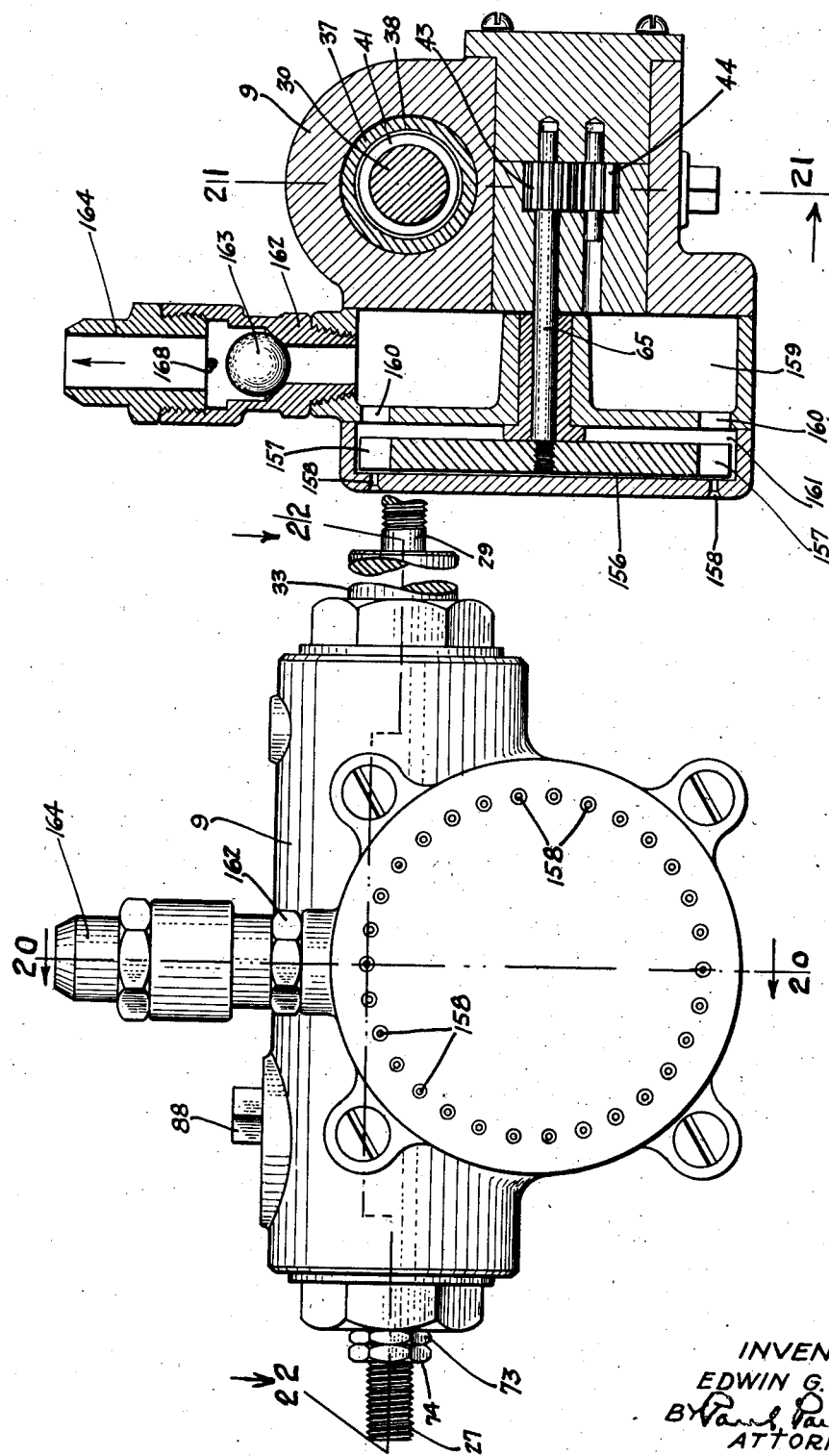
INVENTOR
EDWIN G. STAUDE
BY *Paul, Paul Moore*
   ATTORNEYS Aug. 8, 1933.  E. G. STAUDE  1,921,590
FLUID POWER CONTROLLING MECHANISM
Filed July 3, 1929    13 Sheets-Sheet 12
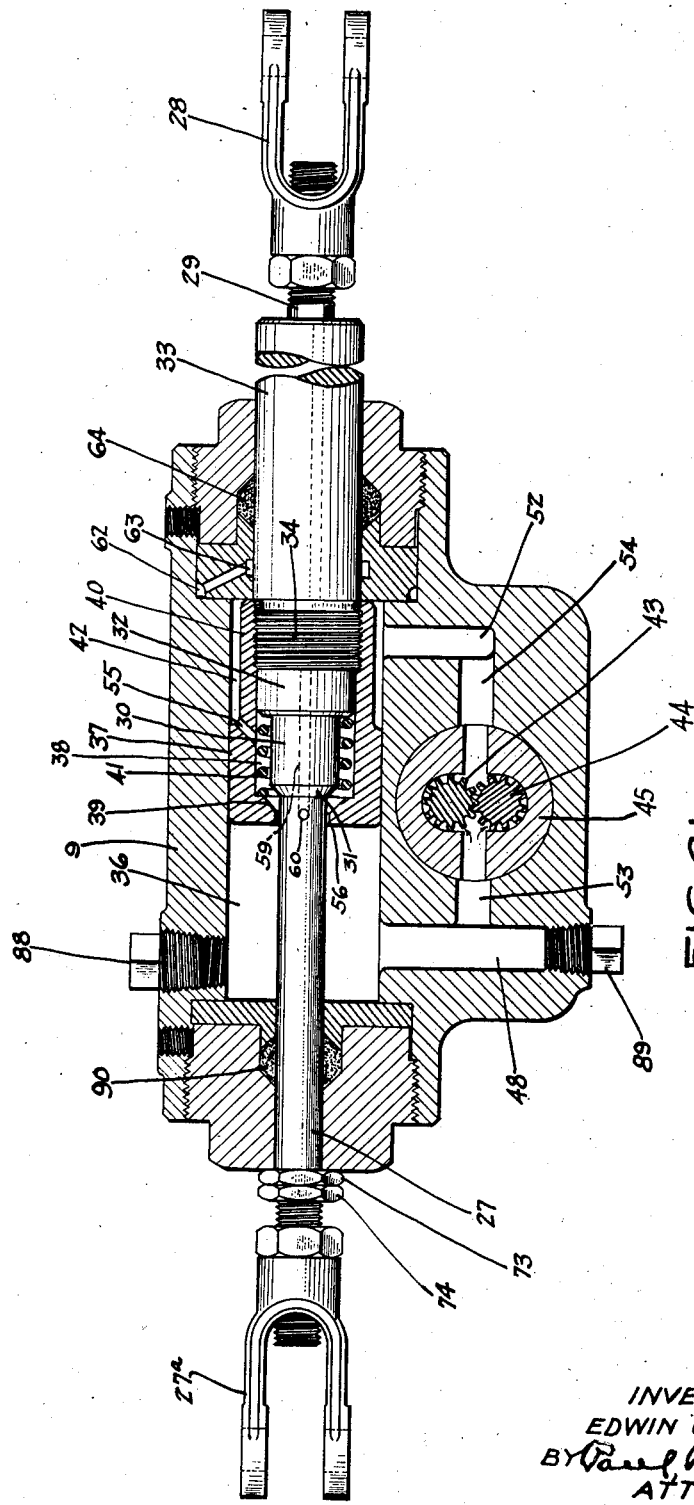
INVENTOR
EDWIN G. STAUDE
BY
ATTORNEYS

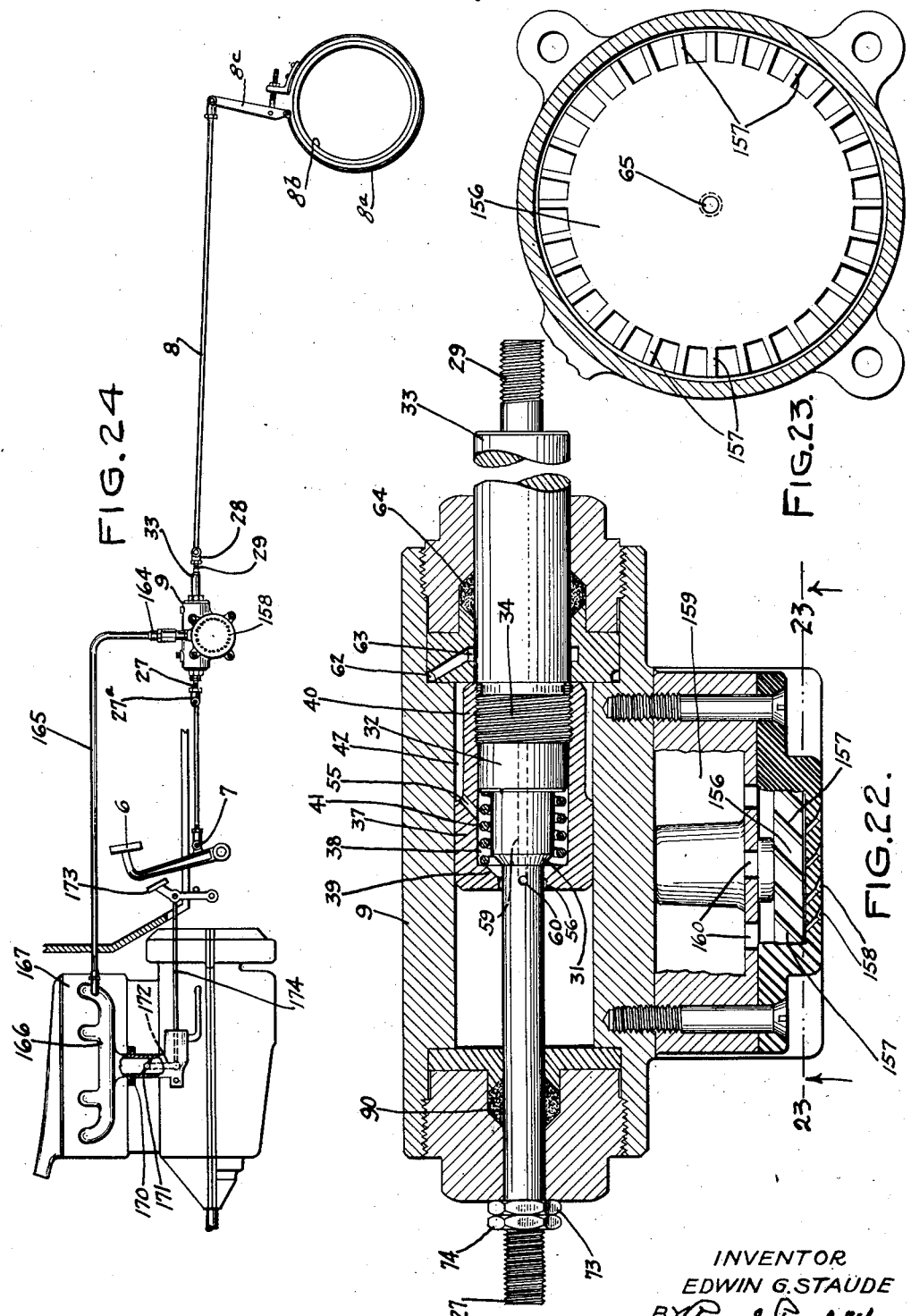

Patented Aug. 8, 1933

1,921,590

UNITED STATES PATENT OFFICE 1,921,590

FLUID POWER CONTROLLING MECHANISM

Edwin G. Staude, Minneapolis, Minn.

Application July 3, 1929. Serial No. 375,846

REISSUED

8 Claims. (Cl. 188—152)

This invention pertains to improvements in dual-powered brake controlling devices, and is related to my patent No. Reissue 15,906, and to application, Serial Number 74,767, filed December 11th, 1925.

This invention relates to improvements in dual-powered fluid-actuated mechanism, for assisting the manual effort in setting brakes on the wheels, and thereby controlling the deceleration of the vehicle with less physical effort.

One of the objects of my present invention is to provide an improved power application for maintaining a fluid pressure when required.

Other objects are to provide a power aplication which shall be in instant service only when required; to provide a mechanism that may be more easily applied to existing vehicles; to provide a greatly simplified construction; to devise a unit that is capable of operating at high pressure thereby reducing its size for the work performed; and to provide a simple method of mounting the mechanism which may readily be attached in the brake line, without interfering with existing cross members, floor boards, and so forth.

Other objects, advantages and features of the invention will appear from the following detail description.

Features of the invention include all details of constructions, and combinations and sub-combinations of the parts disclosed in the drawings.

In the accompanying drawings, forming a part of this application:

Figure 3 is a top plan view of the mechanism embodying my invention;

Figure 4 is a vertical section on the line 4—4 of Figures 3 and 8, looking in direction of the arrow;

Figure 5 is a longitudinal vertical section on line 5—5 of Figure 8, looking in the direction of the arrow;

Figure 6 is an end view of Figures 4 and 5 showing the electrical contact section;

Figure 7 is a plan section on line 7—7 of Figure 6, looking in the direction of the arrow;

Figure 10 shows a vertical longitudinal section of a modified embodiment of my invention;

Figure 11 is a vertical cross-section from the line 11—11 of Figure 10 looking in the direction of the arrow;

Figure 12 is a detailed section on the line 12—12 of Figure 10;

Figure 13 is a detailed section on the line 13—13 of Figure 2 showing the manner of mounting my invention when used in connection with the brake line as in Figures 1 and 2;

Figure 14 is a detail of one of the supporting links shown in Figure 13;

Figure 15 is a section of supporting link on line 15—15 of Figure 14;

Figure 16 shows a vertical section of a second modified embodiment of my invention, in which the device is applied directly to control the fluid pressure line of the so-called hydraulic brakes;

Figure 17 is a cross section on line 17—17 of Figure 16;

Figure 18 is a cross section on line 18—18 of Figure 16;

Figure 19 is a side elevation illustrating a third modification embodying my invention, in which the vacuum principle is utilized;

Figure 20 is a section on the line 20—20 of Figure 19 looking in the direction of the arrow;

Figure 21 is a vertical section on line 21—21 of Figure 20;

Figure 22 is a horizontal section on line 22—22 of Figure 19;

Figure 23 is a vertical section on line 23—23 of Figure 22;

Figure 24 is a diagrammatic view showing my vacuum-controlled device in relation to a brake pedal, intake manifold of a motor, brake rod connection and conventional brake; and Figure 25 is a plan section on line 25—25 of Figure 5 illustrating the circulation passages including the by-pass with the check valve controlling it.

Figure 1:
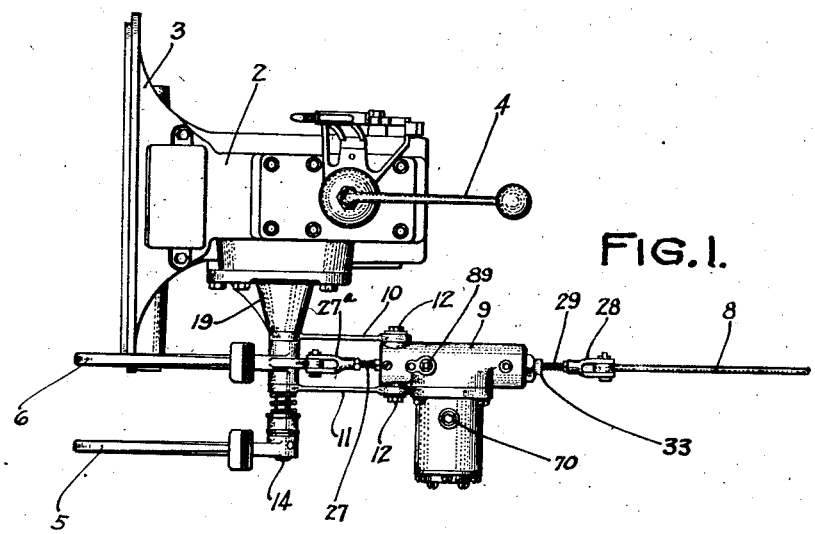
Figure 1 is a top plan view of a motor vehicle transmission, supporting the clutch and brake pedal bracket to which my invention is applied.

The invention may be considered as an improvement on my Reissue Patent No. 15,906.

In the application of a hydraulic pump for this purpose, it is common to provide one of the pump gears on the transmission shaft. Since this shaft is usually 1⅜ inches in diameter, it follows that the diameter of the pump gear cannot well be anything under three inches. In order to get the required proper volume of one cubic inch per revolution of the propeller shaft, it involves a pump gear face of about half an inch. The co-acting gear must necessarily be of the same size in order to keep the speed down when the car runs at higher speeds.

When power take-off from the transmission is used, it is necessary to provide sufficient fluid capacity to give ample displacement or movement of the mechanism for assisting in applying the brakes at a time when the car is practically at a standstill. Therefore, the pump mechanism must have volume sufficient to cause the proper action at the very slowest speeds, without lagging back of the manual effort. At this time, the pump gear revolves less than fifty revolutions per minute. Because of this slow speed, high pressure is impractical due to fluid leaking past the gear teeth at such very slow speeds. In order to have a pump of the proper capacity for the very lowest speeds, it is evident that it will have to have very much greater capacity than necessary at speeds thirty miles per hour or greater.

By the use of the invention herein described, the above named objections are entirely overcome for the reason that, instead of the pump gear revolving at less than fifty revolutions per minute, just before the stopping period and causing a maximum fluid pressure not to exceed one hundred fifty pounds, very much smaller pump gears revolving at the rate of ten thousand revolutions per minute and developing a pressure of more than five hundred pounds per square inch are used, and therefore adequate power is assured whatever the speed of the car. This is an important feature of my invention. This for the reason that instead of taking the power from the transmission shaft, the speed of which reduces proportionately with the speed of the vehicle, I use the current from the storage battery through a small high speed motor, running ten thousand revolutions per minute, using less than one hundred watts and which generates a pressure of over five hundred pounds per square inch with a pair of pump gears three-eighths of an inch pitch diameter, one-eighth of an inch face, twelve teeth, thirty-two pitch.

Where it is undesirable to use the current from the storage battery, I use a vacuum-operable turbine for driving the pump gears at ten thousand revolutions per minute, obtaining the vacuum effect by connecting the device by means of a three-eighths inch copper tubing with the intake manifold of the motor. Of course, this connection may be made at any part where suction effects can be obtained. Moreover, the suction effects may be produced in other ways than by connection with the engine. The use of the vacuum, either produced as the result of the engine operation, or otherwise, is considered an important feature of the invention. By running the pump gears at high velocity and by obtaining the high pressure, I am able to obtain either more pulling power on the brake rod with a given size unit, or obtain the same pulling power on the brake rod with a proportionately smaller unit. Inasmuch as the size and weight of any mechanism on a motor vehicle are important considerations, the advantages obtained by the construction herein are additionally important. By use of the means herein a small unit of small weight is produced. Another important feature is that the device is connected as a part of the brake connection in the brake line. The power to the device can be obtained through hollow flexible connection. Another important feature is the fact that when a motor is used it is carried by, or as a part of, the unit. Another important feature is that a very small motor can be and is used.

I have shown that it takes a pumping capacity of one cubic inch per one revolution of the pump gear where the pump is driven from and at propellor shaft speed. If for every revolution of the propellor shaft one cubic inch is circulated in the system, running at thirty miles per hour, which is the equivalent of fifteen hundred revolutions per minute, there would circulate fifteen hundred cubic inches or about sixty-five gallons of fluid per minute whether the brake is used or not.

Under my present invention herein disclosed the fluid circulates only when the brake is being applied, a feature of the invention. I can do this only because of the small volume required, but the high speed of the pump gears and the high pressure with the pump gears running at ten thousand revolutions per minute I am able to reduce the size of the gears proportionately to one-eighth of an inch face and three-eighths of an inch pitch diameter so that instead of obtaining a volume of one cubic inch per revolution, I actually obtain only .009 of a cubic inch but running ten thousand revolutions per minute, or one hundred sixty-six revolutions per second, I actually get one and one-half cubic inch fluid displacement per second, and because of the high pressure of five hundred pounds per square inch, I need only one-half a cubic inch displacement to give me the same braking effort as formerly required with one and one-half cubic inches owing to the difference in pressure. Since I am able to obtain one and one-half cubic inches displacement per second at one hundred sixty-six revolutions per second and since only one-half a cubic inch is required to set the brakes, it follows that I can set the brakes in one-third of a second which is faster (an important feature of the invention) than brakes can be set by manual effort, therefore there can be no lagging in brake effort. A pump gear one-eighth of an inch face and three-eighths of an inch pitch diameter has a pumping face area of .0078 inches. Multiply this by five hundred pounds pressure and .1875 inch radius of pump gear equals seven pounds torque at three-sixteenths of an inch radius, or one and one-half inches pound torque to obtain five hundred pounds pressure, practically instantaneously; another important feature.

For the purpose of computing vacuum values on a motor intake manifold when the butterfly valve is closed for operating windshield wipers, vacuum tanks, and so forth, ten pounds vacuum is generally conceded to be available. Where I desire to drive the pump by a vacuum turbine I provide a small three inch diameter turbine wheel with a quarter inch face. I also provide thirty equally spaced air inlet holes one-sixteenth of an inch diameter on a one and three-eighths inches radius. The area of one-sixteenth inch round is .003 inch times thirty holes equals .09 area, assuming the full vacuum value of ten pounds I can deliver actually a maximum of four inch pounds torque when only one and one-half inch pound torque is required for five hundred pounds fluid pressure.

To use electric current from the battery, I have found in practice that in order to secure a one and one-half inch pound torque at ten thousand revolutions per minute, a motor about one hundred watts capacity is required, which is about twice the capacity used in the ordinary electric motor car horns or windshield wipers, and like these motors full speed is obtained almost instantly. Both the vacuum-turbine and the electric motor run only when the brake is in use, and there is no waste of power; an important feature of the invention. The ratio between brake pedal movement to brake rod movement is usually about three to one, so that a pressure of one hundred pounds applied to the foot pedal causes a pull on the brake rod of three hundred pounds, therefore, for motor cars generally it is sufficient if the device be so designed as to be capable of exerting a pull on the brake rod up to two hundred and fifty pounds, in addition to that manually exerted. Of course, the present invention need not depend on any appreciable amount of manual or other power assistance.

This invention lends itself admirably to use with a device in which the power can be applied proportionately and progressively such as shown in my patent application, Serial Number 74,767 dated December 11th, 1925. It is quite evident that a brake power mechanism where the power is not absolutely under perfect control at all times, but may either be "all on" or "all off", is absolutely unsafe and impractical.

In the drawings, 2 represents an ordinary motor car transmission case, having the usual bell fly wheel housing 3, and the gear shift lever 4, clutch pedal 5, and the ordinary brake pedal 6. Between the usual brake rod clevis connection 7 and the brake rod 8, I mount my brake control unit generally designated 9, additionally and movably supporting same from links 10 and 11, which are pivoted at one end as at 12, on opposite sides of the member 9, and at the other end to shaft 14, see Figures 1, 2, 13, 14 and 15. The brake band is indicated at 8ª, the brake drum at 8ᵇ and the band operating lever at 8ᶜ. To line up and locate the position of the links 10 and 11, I provided the set screw 15 passing through a threaded portion of a depending arm 17 on the links 10 and 11. The set screw passes through the depending arm 17, and bears against lug 18 which is formed on the pedal bracket 19 secured to the transmission case 2, see Figure 2. As will be noted in Figure 13, the links 10 and 11, are located on each side of the brake pedal bearing 20, and at the opposite end the links 10 and 11 fit over suitable lugs 21 and 22 formed on the member 9. To keep the links in position, I provide washers 23 and 24 held in place by cap screws 25 and 26.

Figure 2:
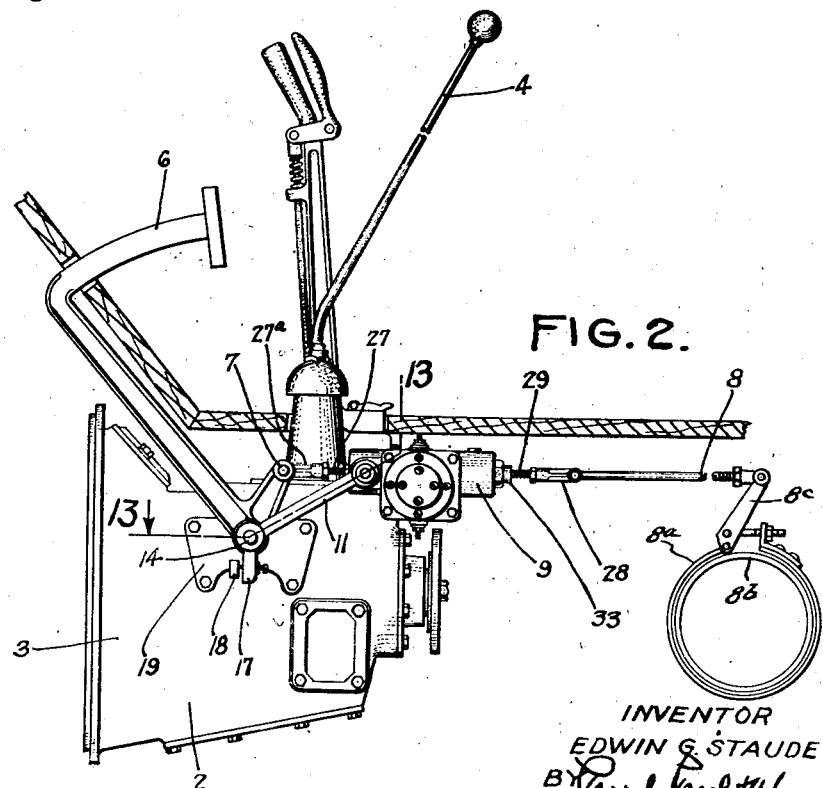
Figure 2 is a side elevation of Figure 1.

Referring to Figures 1, 2 and 4, a clevis 27ª is pivoted as at 7 to the pedal 6, and is secured to the shaft stem 27 as shown, the threaded connection permitting adjustment. At the opposite side of the casing 9 there is a clevis 28 pivoted at one end to the brake rod 8 and adjustably secured by threading to the threaded portion 29 of the element 33. From the foregoing description and also by reference to Figure 4, it is clear that by depressing the pedal 6, a pull will be exerted on the brake rod 8, through the clevis connections 27ª—28, parts 29 and 27, and intermediate connections now to be described. Rod 27 is integral or has formed upon it an enlarged portion 30 tapered at the point of junction to provide a seat 31. There is also provided an enlarged portion 32 larger than the portion 30, and providing a circumferential shoulder as a spring seat. The threads 29 are arranged on a reduced portion of a stem element which includes an enlarged portion 33 having a threaded end 34. The end of the element 32 normally abuttingly engages the end 34 of element 33. Within the bore 36 of the casing 9 is a hollow piston-like valve seat member 37 having a bore 38, and counterbored to provide a seat 39 with which the seat 31 of the member 30 is cooperable, to control fluid flow in the pressure system. The opposite end of the bore 38 is threaded as at 40 to receive the threads 34 on the member 33, and thus secures the casing for movement with 33. A coil spring 41 abuts the wall of the bore 38 and the shoulder formed by element 32, and tends to move the parts to the position shown in Figure 4 with the end of the element 32 abutting the end of the element 33 as a stop, and with the end of the element 37 abutting the face of stuffing box member 35. The rear portion of the hollow valve seat member 37 is exteriorly counter-turned, and is therefore of smaller diameter to provide passage 42 which permits free flow of fluid around one end portion. This circumferential passage forms part of a fluid circuit hereafter to be described, and including bore 36, passage 42, passage 55, bore 38 and opening 56 of element 37 (of greater diameter than shaft 27).

Figure 8:
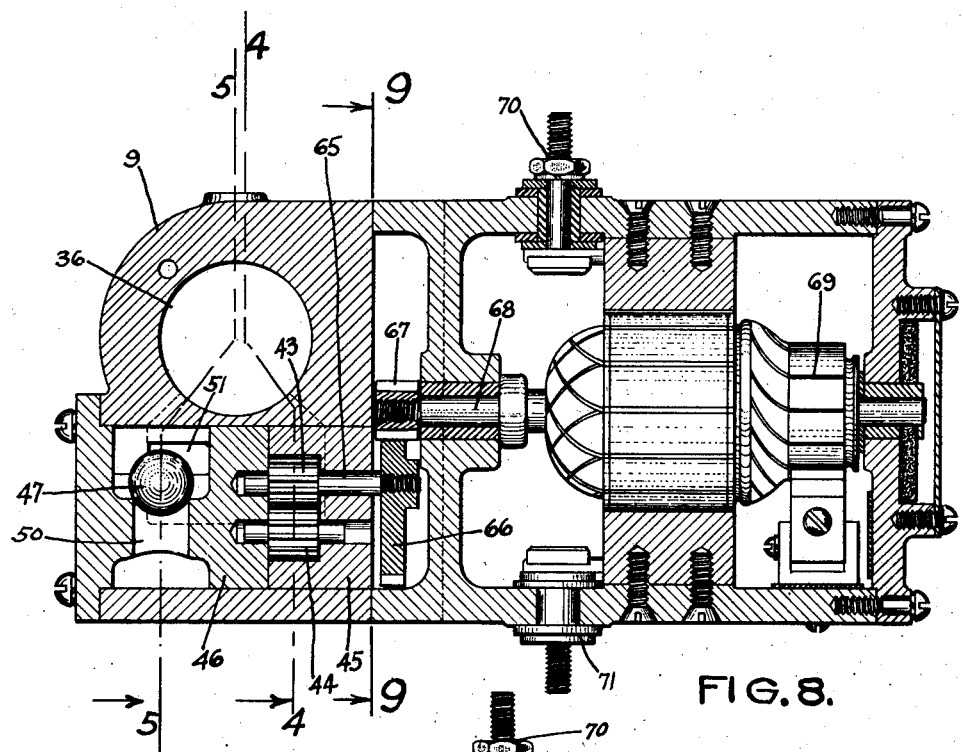
Figure 8 is a section on line 8—8 of Figure 4.
Figure 9:
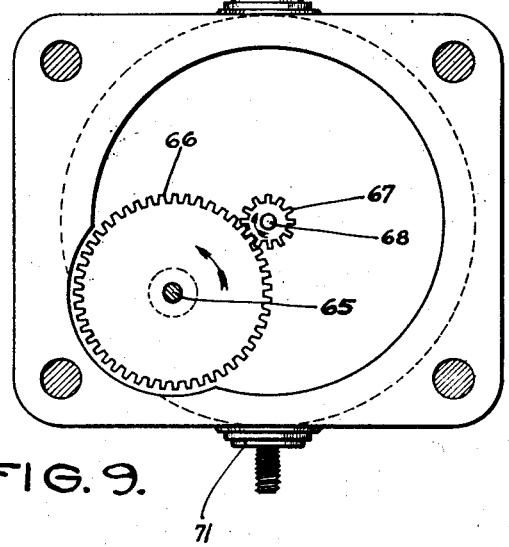
Figure 9 is an end view on line 9—9 of Figure 8 looking in the direction of the arrow.

A series of passages are in this instance included in a fluid circuit, and circulation in this circuit is controlled by a pair of pump gears 43—44 mounted in castings 45—46, see Figures 4 and 8. The casting 46 is provided with a passage controlled by a check valve 47, see Figures 5 and 8. These structures are features of the invention. The check valve is used so that if for any reason the pump gears 43—44 stop during the period when braking movement is needed, or during that movement, the fluid trapped in front of the movable valve casing 37 can be by-passed through the passages in direction of the arrows, see Figure 5. The passages are indicated at 49—50—51—52, and passage 52 leads into the rear of the movable valve element 37, which operates in bore or chamber 36. The ball check valve will, however, prevent the flow of the fluid in the opposite direction so that when the pump gears generate a pressure the ball 47 will rest securely on its seat. This is a valuable feature.

Referring to Figure 4: As the small pump gears revolve in the direction indicated by the arrow, and whenever 31 is not seated at 39, the fluid in the forward part of the chamber 36 will flow into the passage 48, passage 53, around the pump gears 43 and 44, out through the passage 54, into the passage 52, around the space 42, through the angular passage 55, into the space around the member 30, past the valve 31, and the seat 39, through the opening 56, around the member 27 back into the forward part of the chamber 36, when the circuit will be completed.

Figure 5 shows the operation when braking, in which the valve is moving forwardly with the valve 31 seated on its seat 39 and spring 41 under compression. Since the fluid cannot pass the valve and seat, pressure is immediately built up back of the slidable valve seat member 37 at the point 57, this pressure acting against the enlarged portion 32 and exerting a back pressure on the rod 27 tending to open the space between the valve 31 and its seat 39.

In practice, I provide the proportionate area against which this back pressure acts as substantially twenty per cent of the total available area against the back of the valve seat member 37. The purpose here is substantially the same as in my pending application, Serial Number 74,767, except the construction is greatly simplified, and costs of manufacture reduced. The purpose is that of obtaining the necessary progressive "feel" on the brake pedal, which shall always be proportional in the ratio of practically five to one of the additional "booster" effort of the actual fluid pressure at the point 57.

In order to provide an outlet for the fluid which may accumulate at the point 58, a hole 59 is drilled in the center of the member 30 and 32 as shown in dotted lines, Figures 4 and 5, and this hole connects with a hole drilled crosswise through the rod 27. This hole connects with the forward end of the chamber 36 on the low pressure side of the unit. There is also provided a channel 61 connecting the low pressure side of the unit with any leakage that may accumulate at the points 62 and 63 in the bearing and stuffing box 64.

Referring to Figure 8, the pump gear 43 is formed integral with the shaft 65 on the end of which is secured a small spur gear 66, meshing into this spur gear is a pinion 67 secured to the rotor shaft 68 of a small electric motor having the usual commutator 69 and terminals 70 and 71. From the description just given it is clear that when a circuit is closed across terminals 70 and 71, the motor will instantly start, and through the action of the gears 67—66, shaft 65 and the pump gear 43—44, immediate circulation of the fluid will be obtained. Referring now to Figures 4, 5 and 7: In order to make and break this circuit automatically as a result of break pedal action, the following means is provided: A sleeve 72 slides upon rod 27 and abuts one of a pair of nuts 73 and 74 properly adjusted on the rod 27. Spring 75 acts to move sleeve 72 toward said stop nuts. On the sleeve 72 is an insulating retainer ring 76, and secured to the retaining ring 76 is a brass ring 77. Secured in a counter-bore, 78, of the member 9, is the member 79 made of insulating material, and held in place by screws 80 and 81. Secured to the insulating material 79 are small copper blocks 82 and 83 connected by screws 84 and 85 which represents terminals for the connections 86 and 87.

The insulated wire 87 is connected by a suitable conductor 87a with one terminal of battery 88a. The opposite terminal of this battery is connected to the terminal 70 of motor 70a, by conductor 70b. The opposite terminal 71 of the motor is connected by conductor 86a with wire 86. The conductors 86a and 70b are also indicated in Figure 11.

From the description just given referring to Figures 4 and 5, 6 and 7, it is clear that as the pedal is depressed and the rod 27 moves in the operation of setting the brakes, jam nuts 73 and 74 will move away from the insulating member 79 and causing the sleeve 72 actuated by the spring 75, to bring the ring 77 in contact with the blocks 82 and 83, thus closing a circuit and instantly starting the motor which continues to run at full speed until the pedal is entirely released, which will bring the jam nuts 73 and 74 against the sleeve 72, compressing the spring 75 and breaking the circuit. For the purpose of filling chamber 36, and all of the passages, with fluid, (for example equal parts of glycerin and alcohol) a plug 88 is provided. Suitable packing 90 is provided around the rod 27.

In Figure 10, I have shown a modification of the construction just described, which is a feature of the invention. The form includes a tubular valve seat member 91, providing a seat 94 with which valve 92 cooperates. The valve has a stem 93. The valve 92 is adapted to be unseated by spring 95. The movable valve seat member 91 has passages 96, which are connected with the chamber 97 by passages 98 connecting in turn with passage 99, controlled by pump gears 43 and 44, and communicating with passage 52, in turn connecting with the forward end of the movable valve member 91. I provide a spring collar 100, fitting in a recess 101 on the end of the movable valve seat 91. The clamp collar has lugs 102 separated by bushing 103, see Figure 12, and held as a unit by a bolt 104. Mounted on the bushing 103 is a lever 105, one end of which bears against the member 93, the opposite end being connected to the clevis 106 by a pin 107. The clevis is secured to the rod 108, the end of which is connected at the point 7 to the usual brake pedal 6. As the pedal 6 is compressed, it will pull on the rod 108 and through the clevis connection 106 it will pull on the lever 105, which is pivoted at 103. The opposite end of the lever will push on the member 93 compressing the spring 95 and closing the valve 92 against the seat 94. If the fluid is in circulation, a pressure will immediately be set up to assist the manual effort. It will be understood that switch mechanism operable by the element 93 of Figure 10 may control the motor to set up fluid pressure in substantially the same manner as shown in Figure 4 wherein the element 27 operates the switch 77. A continuation of the pull on the rod 108 will cause the member 91 to bear against roller 109 on the arm 110, which is pinned to a cross shaft 111. This cross shaft 111 represents the brake shaft usually found on motor vehicles.

Although the construction shown in Figure 4 is applicable to most motor vehicles, there are some vehicles wherein, in order to make the installation in a practical manner, certain structural modifications are advisable. The construction shown in Figure 10 is adapted for use under conditions where lack of space prevents the use of other forms of the invention. This figure illustrates a "push type" installation with reverse valve motion, particularly applicable to certain trucks, where space is limited, and where low cost of installation is of major importance.

The regular brake rod fork 106 is connected as at 107 to a lever 105, which lever is pivoted on the bushing 103, mounted on valve seat element 91, and operates as follows: By pulling on the rod 108 the tubular valve seat member 91 is moved forwardly against the roller 109 on the arm 110 to rock the shaft 111. As soon as the brake-operating shaft 111 offers some resistance, the member 91 cannot move the arm 110 further without additional effort or pull on the rod 108. This additional pull causes the arm of lever 105 to rock on the bushing 103 and push on the valve stem 93 against the tension of the spring 95, toward seating position, and against the fluid pressure. By this action, pressure is built up in the passage 52, due to the restricted flow. This built-up fluid pressure acts on the surface 91a of the exposed area of the tubular valve seat element 91 to move this element to, in turn, move the arm 110, in brake-applying direction.

When the arm 110 offers further resistance, a further pull on the rod 108 will still further compress the spring 95 and further reduce the opening between the valve 92 and the seat 94 which will further increase the pressure, proportionate to the pull in the rod 108, until the final seating of the valve 92 on the seat 94, which results in setting up the maximum fluid pressure acting on the surface 91ª.

Due to the manner of connecting the rod 108 to lever 105, all of the manual effort on the rod 108 can be directly and mechanically transmitted to the roller 109, in addition to the fluid pressure action or in the absence of any fluid pressure action.

In this device, part of the fluid pressure effort is thrown on the pedal 6 so that the operator may "feel" a proportionate increase in this pressure. The link 108 is pivoted to the lever 105 at a point over the pivotal point of the lever with the element 91. The lever not only serves the purpose of moving the valve 92 toward and against seat 94, but moves the stem 93 in a direction opposite to that of pedal motion. Because of the arrangement of the parts, and because the area of the end of the movable valve seat member 91 is greater than the area of the valve 92, it follows that all pressure on the member 91 is transmitted to the roller 109, and all pressure on the valve 92 is transmitted to the pedal, and thus the operator can "sense" the latter pressure and can control car deceleration smoothly without the danger of setting the brakes violently, or setting up a dangerous "grabbing" action.

Referring to Figure 11, I have shown the motor directly connected to the pump gear shaft 65, instead of using gears 66 and 67. Either construction is desirable depending on the size of the pump gears, fluid volume, required starting torque, and so forth. In the construction shown in Figures 10 and 11, I have dispensed with the check valve 47, by providing a reservoir or air chamber so that the fluid displaced by the movement of the movable valve members may pass into the air space 112 in the event that for some reason the pumping mechanism is inoperative. The general operation of the device just described is similar to that shown in Figures 4 and 5. In the first embodiment, the brake rod connection runs through the unit, whereas in the construction shown in Figures 10, 11, and 12, both the members comprising the movable valve and valve seat protrude from one end of the unit similar to the construction shown in my application dated December 11th, 1925, Serial Number 74,767. In the construction shown in Figure 10, there is provided the same proportionate fluid pressure against the pedal 6 through the action of the pressure against the valve 92 through the opening 113, as compared with the area of the total exposed end of the movable valve member 91.

A suitable filling plate 114 is provided to correspond with the filling plug 88, and a suitable drain plug 89 for the system is also provided. The unit is secured to a cross member 115 which is part of the motor car frame, by suitable lugs 116 and 117, the plate 118 and the bolt 119.

In Figure 16 the invention is applied to a well known type of hydraulic brake in which the piston is connected in the fluid master cylinder directly with my unit, and also in which provision is made for the usual reservoir for replenishing fluid lost by leakage.

Referring to Figure 16 there is provided the usual pedal 6 and connection 7 and the rod 27, except that the unit is placed on the opposite side of the pedal 6, and a pushing effect is obtained by the action of the pedal. This pushing effect is against the rod 119 which carries a portion of an electrical contact mechanism, the functional equivalent of that shown in Figures 5, 6 and 7. The mechanism includes a sleeve 120 held against the shoulder 121, of the member 122, by a spring 123. The sleeve 120 carries the insulating material 124, and brass ring 125 is adapted to contact with the hooked bars 126 and 127, which are secured to the terminal outlets similar to that described in Figures 4, 5, 6 and 7.

The member 122 corresponds to the valve member having a valve 128 cooperating with a valve seat 129 of the movable member 130. Formed integral with the movable valve seat is a piston 131. The valve member 122 has a reduced portion 132 formed on its inner end, and the valve is adapted to be held in its open position by spring 133 which abuts plug 134 screwed into piston portion 131 of the movable valve seat member 130.

In order to replenish any fluid which may become lost in the cylinder 135, in which the piston 131 operates, a chamber 136 is provided which is connected with the cylinder 135 by a port 137 so that fluid may flow through this opening 137 and into a cylinder and replace any fluid which may have seeped out through the various connections throughout the system while same is under high pressure.

The movable valve seat member is reduced to provide a fluid channel 138 as part of the fluid circulating system. There is also provided a cross channel 139 connecting the space 138 with the space 140. Space 140 in turn (when valve 128 is unseated) connects with space 141 connecting with channel 142. The reservoir 136 connects with the channel 143, leading into channel 144. Channel 144 connects with pump gears through channel 145, which pump gears exhaust into channel 146 directly into channel 142. Ordinarily fluid fills the entire system, and if the pump is inactive, movement of the pedal to braking position causes the valve 128 to seat against the valve seat 129, compressing the spring 133, exerting pressure against the piston 131 and compressing the fluid in chamber 135, which results in pressure in the connection 147 to operate the brake. The spring 133 tends to maintain the valve 128 unseated. For the purpose of limiting movement of element 122, there is provided a stop pin 148, operating in a slot 149, see Figures 16 and 17. The piston 131 is also limited in its movement within the cylinder 135 by shoulders 150—151, see Figure 18, so that the passage connecting 143 with 144 will not be obstructed at any time. In order to establish fluid communication between chamber 135 and the reservoir 136, when valve 128 is open, there is provided a passage 152 in a plug 134, and also there is provided a passage 153 in member 132, connected by cross passage 154. Fluid filling the chamber 140 flows through the passage 154 into passage 153 and out through 152. When the valve 128 is closed against the seat 129 the passage 154 is cut off at point 155 so that pressure may be set up in the chamber 135, and this cut off prevents flow through the passages 152, 153, 154.

Figure 16 also illustrates a "push type" brake assistor adapted for hydraulic brakes. In this instance, the "back pressure" force against the pedal 6 is determined by the difference between the cross-sectional area of the members 130 and 122.

In Figures 19 to 24 inclusive, there is illustrated a modified form of power means for operating the pump gears 43—44. In this instance, there is provided a disk 156 having vanes 157 set at an angle (see Figure 22) to air inlet ports 158. The idea of applying the vacuum principle in the present environment, as well as the constructions set forth, are important features of the invention. A vacuum is created to suck air through ports 158 (see Figure 20) across vanes 157 through chamber 161, ports 160, chamber 159, and through member 162, past ball check valve 163, and through brass tube 164, which tube is connected as shown in Figure 24, by tube 165 with the intake manifold 166 of a motor 167. Of course, this connection may be made to other suction or vacuum-creating apparatus, either to some other part of the engine, or to means other than the engine.

The carburetor is indicated at 170, the butterfly valve at 171, the butterfly valve operating lever at 172, the accelerator pedal at 173 and the accelerator connecting rod at 174, this rod being as usual connected with the lever 172. When the foot is removed from the throttle pedal 173 the parts assume the position shown in the figure with the butterfly valve closed or substantially closed, and sufficient vacuum is produced to operate the small pump gears at high velocity. It will be understood that when the butterfly valve is open the suction or vacuum effect is reduced so that the turbine 156 is inoperative or operates only at substantially reduced speed.

It will be understood that the valve mechanism of the units illustrated in Figures 19 and 20 may be the same as that illustrated in Figure 4, or as that illustrated in Figure 10.

The operation of this vacuum-powered motor is as follows: The vacuum is created in the pipe 165 when the butterfly valve at the carburetor is closed, and this vacuum ordinarily is about ten pounds per square inch. The ball 163 is raised against the stop 168 to create a vacuum within the chamber 159, which through connection to the ports 160 create vacuum with the space 161. Air rushing through parts 158 open to the atmosphere will blow against the inclined vanes as shown in Figure 22, and cause the disc 156 with the vanes 157 to instantly rotate at high speed and revolve the pump gears 43 and 44. The brakes are seldom, if ever, applied without removing the foot from the accelerator control, and this instantly closes the butterfly valve, and sets up a vacuum sufficient to raise the check valve 163. During normal driving, when the carburetor butterfly valve is partly open the vacuum is not sufficient to raise the check valve 163 and therefore the disc 156 and vanes 157 will not necessarily revolve continually, although there is no objection to the pump revolving continually at low speed when vacuum power is used, since the carburetor adjustment can be made to accommodate this continual flow of air, to properly balance the mixture.

While I have shown my dual fluid power controlling mechanism as applied to assist in setting the brakes on motor vehicles, my invention may, however, be successfully applied to many other uses, especially with the individual electric motor drive.

A salient feature of the invention is the use of a small size, small weight, high velocity motor for obtaining great power by the use of small pump gears operated at high velocity, whereby, among other things, a casing unit of small size and weight, adapted to be connected directly in the brake line, can be had. I do not claim merely the sizes per se but consider the idea of means for unfailingly obtaining sufficient pressure in the fluid system by a leverage system including small pump gears rotated at high velocity, the gears being controlled by means operable at very small cost, and which is of small size and weight such as an electric or vacuum controlled motor. The ideas of means in a single unit connectible in the brake line with the brake line elements including pedal-operable and brake operating connections, connected to be controlled by and to control a single valve in a manner to progressively block circulation in the fluid system and to be fluid-operated to progressively set the brakes is also a valuable feature.

So far as I am aware no one has ever conceived, in an environment of the kind mentioned herein, that great power can be obtained in a small compass by operating very small gears at high velocity by means of a high speed motor of small electrical capacity; nor has anyone conceived that this high velocity operation makes it possible to construct a small size, light weight, self-contained unit, including pressure-controlled means for operating the brakes with the unit directly connectible in the brake line.

I claim as my invention:

1. A brake control comprising a fluid circulating system including intercommunicating passages, a pedal, brake-applying means, a valve member and valve seat member cooperable therewith for controlling flow through the fluid system, one of the members being connected to the pedal and the other to the brake-applying means, small pump gears for controlling pressure in the system, means for operating said gears at high velocity, and means operable by pedal movement to braking position to initiate operation of said gear operating means.

2. A device of the class described comprising passages forming a fluid circulating system, and including a pump adapted to set up pressure in the system, a pedal, a brake mechanism, a valve member, and a seat member for said valve member both movable in a portion of the system and cooperable to block fluid circulation, one element being adapted to be moved by the pedal to block circulation, and the other adapted to be moved as the result of blocked circulation to re-establish circulation and to move the brake mechanism to apply the brakes as the result of such circulation re-establishing motion, means adapted to operate said pump at high velocity, means operable by pedal movement to braking position to initiate operation of said gear operating means, said valve and seat means being cooperable in a manner to obtain manual application of braking pressure, and a valve controlled by-passage as a part of said system adapted to relieve pressure in case the gears become inoperative and block fluid circulation.

3. A unit including a fluid pressure system having associated therewith one movable linkage element adapted to be connected to a controlling means and another movable linkage element movable independently of the first and adapted to be connected to a means to be controlled, valve means in the pressure system adapted to control fluid flow therein, and controlled by one linkage element and controlling the other, a gear pump for setting up pressure in the system, motive means adapted to drive said pump, means adapted to be operated as the result of motion of one of the linkage elements to activate the motive means, said unit being mounted on a common base, being adapted to be connected as a link.

4. A device of the class described comprising a fluid pressure system having associated therewith one movable element adapted to be connected to a controlling means, and another movable element movable independently of the first and in a direction axially thereto adapted to be connected to a means to be controlled, valve means in the pressure system adapted to control fluid flow therein and controlled by one of the elements and controlling the other, pump means for setting up pressure in the system, motive means adapted to drive the pump means, and means adapted to activate the motive means as result of motion of one of the elements.

5. In a braking effort amplifying device, a casing having fluid passages, means for producing fluid pressure, valve means in one of the passages for controlling the fluid pressure and against which it acts including two movable elements one within the other and both projecting beyond the casing at one side, a lever against which one of the elements acts to operate brakes, a second lever mounted on one of the elements and adapted to move the other to close the valve, and a motor for operating the fluid pressure producing means.

6. In a braking effort amplifying device, a casing having fluid passages, means for producing fluid pressure, valve means in one of the passages for controlling the fluid pressure and against which it acts including two movable elements both projecting beyond the casing at one side, a lever mounted on one of the elements and adapted to move the other to close the valve, a motor for operating the fluid pressure producing means, and means operated as the result of motion of one of the elements to close the valve, to initiate motor operation.

7. In a braking effort amplifying device, a casing having fluid passages, small pump gears for setting up fluid pressure, valve means in one of the passages for controlling the fluid pressure and against which it acts including two movable elements one within the other and both projecting beyond the casing at one side, a lever against which one of the elements acts, a second lever mounted on one of the elements and adapted to move the other to close the valve and a small high speed electric motor carried by the casing and having such electrical capacity that it can be operated on a small expenditure of electrical energy by an ordinary automobile battery, means directly connecting the motor for operating the gears, whereby high pumping pressure can be substantially instantly obtained upon energization of the high speed motor.

8. In a braking effort amplifying device, a casing having fluid passages, small pump gears for setting up fluid pressure, valve means in one of the passages for controlling the fluid pressure and against which it acts including two movable elements one within the other and both projecting beyond the casing at one side, a lever against which one of the elements acts, a second lever mounted on one of the elements and adapted to move the other to close the valve and a small high speed electric motor carried by the casing and having such electrical capacity that it can be operated on a small expenditure of electrical energy by an ordinary automobile battery, means directly connecting the motor for operating the gears, whereby high pumping pressure can be substantially instantly obtained upon energization of the high speed motor, and means operated as the result of motion of one of the elements to close the valve, to initiate motor operation.

EDWIN G. STAUDE.